(12) United States Patent
Loesch et al.

(10) Patent No.: US 12,487,328 B2
(45) Date of Patent: Dec. 2, 2025

(54) RADAR DEVICE AND RADAR METHOD

(71) Applicant: Robert Bosch GmbH, Stuttgart (DE)

(72) Inventors: Benedikt Loesch, Stuttgart (DE); Arthur Hipke, Leonberg (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 432 days.

(21) Appl. No.: 18/046,594

(22) Filed: Oct. 14, 2022

(65) Prior Publication Data
US 2023/0228846 A1 Jul. 20, 2023

(30) Foreign Application Priority Data
Nov. 3, 2021 (DE) .................. 10 2021 212 376.7

(51) Int. Cl.
*G01S 7/40* (2006.01)
*G01S 7/03* (2006.01)
(Continued)

(52) U.S. Cl.
CPC ............. *G01S 7/403* (2021.05); *G01S 7/03* (2013.01); *G01S 7/295* (2013.01); *G01S 13/42* (2013.01); *G01S 2013/0254* (2013.01)

(58) Field of Classification Search
CPC . G01S 7/403; G01S 7/03; G01S 7/295; G01S 13/42; G01S 2013/0254; G01S 2013/462; G01S 7/418; G01S 7/02
See application file for complete search history.

(56) References Cited

U.S. PATENT DOCUMENTS 8,436,763 B2    5/2013  Wintermantel
12,078,751 B2 * 9/2024  Yoffe ............... G01S 13/881
(Continued)

FOREIGN PATENT DOCUMENTS

EP    3588128 A1 *  1/2020  ......... G01S 13/9004

OTHER PUBLICATIONS

Engels et al., "Automotive MIMO Radar Angle Estimation in the Presence of Multipath," 2017, European Radar Conference (EURAD), 2017, pp. 1-4. <https://www.researchgate.net/publication/322355796_Automotive_MIMO_radar_angle_estimation_in_the_presence-of_multipath> Downloaded Oct. 13, 2022.
(Continued)

*Primary Examiner* — Bernarr E Gregory
*Assistant Examiner* — Anna K. Gosling
(74) *Attorney, Agent, or Firm* — NORTON ROSE FULBRIGHT US LLP

(57) ABSTRACT

A radar device. The radar device includes a transceiver apparatus that comprises at least three transmit antennas and at least three receive antennas or comprises at least two transmit antennas and at least two receive antennas having two-dimensional beam forming, wherein the transceiver apparatus is configured to emit radar radiation using the transmit antennas, to receive radar radiation using the receive antennas, and to generate radar data on the basis of the received radar radiation. The radar device further comprises an evaluation apparatus that is configured to establish whether radar radiation has propagated between the transceiver apparatus and the at least one target either directly or at least partly by way of at least one reflection by evaluating the radar data using a multitarget angle estimation model, wherein the multitarget angle estimation model takes the propagation of radar radiation along at least four paths into consideration.

11 Claims, 2 Drawing Sheets

(51) Int. Cl.
*G01S 7/295* (2006.01)
*G01S 13/02* (2006.01)
*G01S 13/42* (2006.01)

(56) References Cited

U.S. PATENT DOCUMENTS

| | | | |
|---|---|---|---|
| 2021/0341573 A1* | 11/2021 | Amizur | G01S 7/354 |
| 2022/0326343 A1* | 10/2022 | Li | G01S 7/021 |
| 2023/0017983 A1* | 1/2023 | Kunz | G01S 13/582 |
| 2023/0080655 A1* | 3/2023 | Yomo | G01S 7/292 |
| | | | 342/450 |
| 2024/0053467 A1* | 2/2024 | Dvorecki | G01S 13/931 |

OTHER PUBLICATIONS

Engels et al., "Automotive Radar Signal Processing: Research Directions and Practical Challenges," IEEE Journal of Selected Topics in Signal Processing, vol. 15, No. 4, 2021, pp. 1-14. <https://www.researchgate.net/publication/349761472_Automotive_Radar_Signal_Processing_Research_Directions_and_Practical_Challenges> Downloaded Oct. 13, 2022.

* cited by examiner

RADAR DEVICE AND RADAR METHOD

CROSS REFERENCE

The present application claims the benefit under 35 U.S.C. § 119 of German Patent Application No. DE 10 2021 212 376.7 filed on Nov. 3, 2021, which is expressly incorporated herein by reference in its entirety.

FIELD

The present invention relates to a radar device and to a radar method.

BACKGROUND INFORMATION

In addition to distance and relative velocity, the azimuth and elevation angles are of major importance for environment monitoring in driver-assistance systems since they allow lane assignment to be performed and make it possible to determine the relevance of the target. For instance, it can be established whether the vehicle may drive over, into, or under an object.

The azimuth and elevation angles of the targets can be established from amplitude and/or phase differences of transmit antennas and/or receive antennas of an antenna array. To enhance the accuracy and separability of the angle estimation, the MIMO principle (multiple input, multiple output) can be used. For this purpose, a plurality of transmit antennas and a plurality of receive antennas are used, unlike in traditional SIMO radars (single input, multiple output) which comprise one transmit antenna and a plurality of receive antennas.

In angle estimation, the receive signals are compared with an angle-dependent antenna diagram measured beforehand. In the event that there is only one target in a (d,v) cell, where d is distance and v is relative velocity, the estimated angle is generated as the position of the best match between the receive signal and the antenna diagram.

U.S. Pat. No. 8,436,763 B2 describes a MIMO radar sensor that uses the MIMO principle with a code multiplexer and two transmit antennas in order to improve the azimuth angle estimation. In this case, the two transmit antennas are arranged on the left-hand or right-hand edge of the entire array so as to obtain the largest possible virtual aperture.

In the case of multipath propagation, four paths arise, specifically a direct or reflected first path portion during emission in combination with a direct or reflected second path portion during receipt.

Therefore, when only two transmit antennas are used, the advantages of MIMO, for instance a larger virtual aperture and improved angle separation, cannot be utilized with multipath propagation. Engels et al., "Automotive MIMO radar angle estimation in the presence of multipath," European Radar Conference (EURAD), 2017, p. 82-85, for example, describes that performance drops back to SIMO levels when multipath propagation is taken into consideration in the signal model. The result is non-coherent averaging of the SIMO angle spectra of the two transmit antennas.

If multipath propagation is disregarded in the signal model, a MIMO angle estimation yields incorrect estimates containing errors of several degrees. This may lead to undesirable system behavior, for example disturbances from vehicles in adjacent lanes or target object losses.

Multipath propagation also means that the virtual array model cannot be used for MIMO beam forming, i.e., transmit-beam and receive-beam forming.

Engels et al., "Automotive Radar Signal Processing: Research Directions and Practical Challenges," in IEEE Journal of Selected Topics in Signal Processing, 2021, describes a workaround that involves beam forming using separate grids for the transmit angle and receive angle. However, this method cannot be used for high-resolution angle estimation since, in this case, the four paths are not observed in a joint signal model.

SUMMARY

The present invention provides a radar device and a radar method.

Preferred specific example embodiments are disclosed herein.

According to a first aspect, the present invention relates to a radar device comprising a transceiver apparatus that comprises at least three transmit antennas and at least three receive antennas or comprises at least two transmit antennas and at least two receive antennas having two-dimensional beam forming, wherein the transceiver apparatus is configured to emit radar radiation using the transmit antennas, to receive radar radiation using the receive antennas, and to generate radar data on the basis of the received radar radiation. According to an example embodiment of the present invention, the radar device further comprises an evaluation apparatus that is configured to establish whether radar radiation has propagated between the transceiver apparatus and at least one target either directly or at least partly by way of at least one reflection by evaluating the radar data using a multitarget angle estimation model, wherein the multitarget angle estimation model takes the propagation of radar radiation along at least four paths into consideration.

According to a second aspect, the present invention relates to a radar method. The radar method comprises emitting and receiving radar radiation using a transceiver apparatus comprising at least three transmit antennas and at least three receive antennas or comprising at least two transmit antennas and at least two receive antennas having two-dimensional beam forming, and generating radar data on the basis of the received radar radiation. According to an example embodiment of the present invention, the method further comprises establishing whether radar radiation has propagated between the transceiver apparatus and at least one target either directly or at least partly by way of at least one reflection by evaluating the radar data using a multitarget angle estimation model, wherein the multitarget angle estimation model takes the propagation of radar radiation along at least four paths into consideration.

The present invention makes it possible to recognize a multipath propagation situation. Furthermore, this allows mirror objects to be suppressed. Mirror objects are non-existent objects that come about when radar radiation that has been reflected back by an actual object is reflected by a reflective object (for example a traffic barrier or a tunnel wall).

According to a further specific embodiment of the radar device of the present invention, the multitarget angle estimation model is a two-target angle estimation model that takes the propagation of radar radiation along four paths into consideration.

According to a further specific embodiment of the radar device of the present invention, the four paths comprise a direct path, a reflection path, and two cross-paths, wherein the four paths each comprise a first path portion from the transmit antennas to the target and a second path portion from the target to the receive antennas, wherein, in the direct path, the radar radiation propagates directly on both the first path portion and the second path portion, wherein, in the reflection path, the radar radiation propagates by way of a reflection on both the first path portion and the second path portion, wherein, in a first of the cross-paths, the radar radiation propagates directly on the first path portion and by way of a reflection on the second path portion, and wherein, in a second of the cross-paths, the radar radiation propagates directly on the second path portion and by way of a reflection on the first path portion.

According to a further specific embodiment of the radar device of the present invention, the evaluation apparatus is configured to calculate a radar power for each of the four paths by evaluating the radar data using the multitarget angle estimation model, which is a four-path model, wherein the evaluation apparatus is configured to establish, by taking the calculated radar powers into consideration, whether radar radiation has propagated between the transceiver apparatus and the at least one target either directly or at least partly by way of at least one reflection. The radar powers differ for situations involving reflections, thereby allowing reflections to be identified. In normal driving situations, there are many highly reflective surfaces and also poorly back-reflecting surfaces, for example tunnels or large delivery trucks. Metal traffic barriers are not directly visible to radar sensors either since they deflect the radar radiation and do not reflect it back to the sensor. By recognizing the reflections, the present invention allows objects such as these to be recognized too, which is particularly advantageous for radar-based clearance recognition.

According to a further specific embodiment of the radar device of the present invention, the evaluation apparatus is configured to establish that radar radiation has propagated between the transceiver apparatus and the at least one target at least partly by way of at least one reflection if a ratio of the radar power of the cross-paths to the radar power of the reflection path and/or direct path is greater than a predetermined threshold value. Owing to the reflection, the cross-paths thus have a significant proportion of the radar power.

According to a further specific embodiment of the radar device of the present invention, the evaluation apparatus is configured to establish that radar radiation has propagated to the target directly if a ratio of the radar power of the cross-paths to the radar power of the reflection path and/or direct path is lower than a predetermined threshold value. Since there is no reflection, there is no significant contribution from the cross-paths either.

According to a further specific embodiment of the radar device of the present invention, the evaluation apparatus is configured, after having established that radar radiation has propagated between the transceiver apparatus and the at least one target at least partly by way of at least one reflection, to recognize a mirror object on the basis of geometric calculations and/or with the aid of tracking the at least one target. Alternatively or additionally, the object that caused the at least one reflection, for example a traffic barrier or a tunnel wall, may be recognized. In particular, the distance, velocity, and/or angle (azimuth angle and/or elevation angle) of the mirror object or reflective object may be determined.

According to a further specific embodiment of the radar device of the present invention, the evaluation apparatus is configured to establish whether radar radiation has propagated between the transceiver apparatus and the at least one target either directly or at least partly by way of at least one reflection by additionally using a single-target angle estimation model, wherein the evaluation apparatus is configured to take a quality of an angle estimation using the single-target angle estimation model into consideration during the establishing. If the quality in the angle estimation using the single-target angle estimation model is high, the evaluation apparatus can establish that there is only one target. If the quality is low, the evaluation apparatus can perform angle estimation using at least one multitarget angle estimation model.

According to a further specific embodiment of the radar device of the present invention, the evaluation apparatus is configured to establish whether radar radiation has propagated between the transceiver apparatus and the at least one target either directly or at least partly by way of at least one reflection by additionally using a further multitarget angle estimation model, wherein the further multitarget angle estimation model takes the propagation of radar radiation along two paths into consideration. The evaluation apparatus is configured to take a quality of an angle estimation using the further multitarget angle estimation model into consideration during the establishing. If the quality is high, the evaluation apparatus can establish that there is no reflection. If the quality is low, the evaluation apparatus can perform another evaluation using the multitarget angle estimation model that takes four paths into consideration. The further multitarget angle estimation model may in particular be a two-target angle estimation model.

According to a further specific embodiment of the radar device of the present invention, the evaluation apparatus is configured, in the event of multiple detections, to carry out an angle estimation for each detection using the single-target angle estimation model, and to establish that radar radiation has propagated to the at least one target directly if the quality of the angle estimation model using the single-target angle estimation model is greater than a predetermined threshold value. In the event that the quality of the angle estimation using the single-target angle estimation model is lower than or equal to the predetermined threshold value, the evaluation apparatus establishes whether radar radiation has propagated between the transceiver apparatus and the at least one target either directly or at least partly by way of at least one reflection on the basis of an angle estimation using the multitarget angle estimation model and the further multitarget angle estimation model.

According to a further specific embodiment of the radar device of the present invention, an angle estimation using the single-target angle estimation model is performed first. If the model fit quality is low, an angle estimation is performed using the further multitarget angle estimation model that takes just two paths into consideration. If the angle estimation quality is low or the angle estimates are implausible, for example are too close together, an angle estimation is performed using the multitarget angle estimation model that takes four paths into consideration. In this case, the relative strength of the cross-paths in relation to the direct path and reflection path is established. A decision is taken as to whether the angles determined using the multitarget angle estimation model are plausible or whether one of the two angles has been estimated owing to multipath propagation.

Further advantages, features, and details of the present invention become apparent from the following description, in which various exemplary embodiments are described in detail with reference to the figures.

In all the figures, identical or functionally identical elements and devices are provided with the same reference signs. Method steps have been numbered to aid clarity but, as a rule, this is not intended to imply any particular chronological order. In particular, a plurality of method steps may also be carried out at the same time.

DETAILED DESCRIPTION OF EXAMPLE EMBODIMENTS

Figure 1:
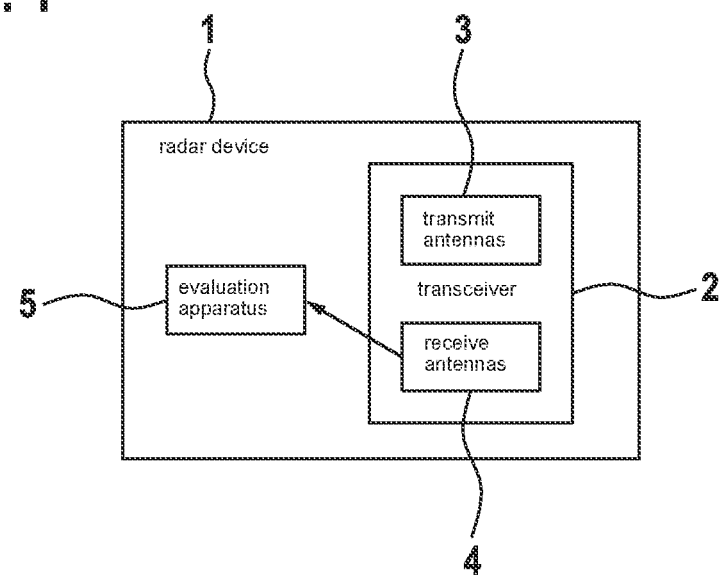
FIG. 1 is a block diagram of radar device according to a specific example embodiment of the present invention.

FIG. 1 shows a block diagram of a radar device 1 comprising a transceiver apparatus 2 having at least three transmit antennas 3 and at least three receive antennas 3. Alternatively, the transceiver apparatus 2 comprises at least two transmit antennas 3 and at least two receive antennas 4, the transceiver apparatus additionally being configured to carry out two-dimensional beam forming.

The transceiver apparatus 2 emits radar radiation using the transmit antennas 3. The receive antennas 4 receive the radar radiation, and the transceiver apparatus 2 generates radar data on the basis of the received radar radiation.

The radar data are transmitted to an evaluation apparatus 5. The evaluation apparatus 5 may comprise a microprocessor, a microcontroller, or the like.

The evaluation apparatus 5 evaluates the radar data. The radar data is evaluated using a single-target angle estimation model, a first two-target angle estimation model that takes the propagation of radar radiation along two paths into consideration, and a second two-target angle estimation model that takes the propagation of radar radiation along four paths into consideration. More generally, multitarget angle estimation models that also take the propagation of radar radiation along more than four paths into consideration may be provided. For example, the multitarget angle estimation model may take more than two targets into consideration.

Using the angle estimation models, the evaluation apparatus 5 establishes whether radar radiation has propagated between the transceiver apparatus 2 and at least one target either directly or by way of at least one reflection.

Figure 2:
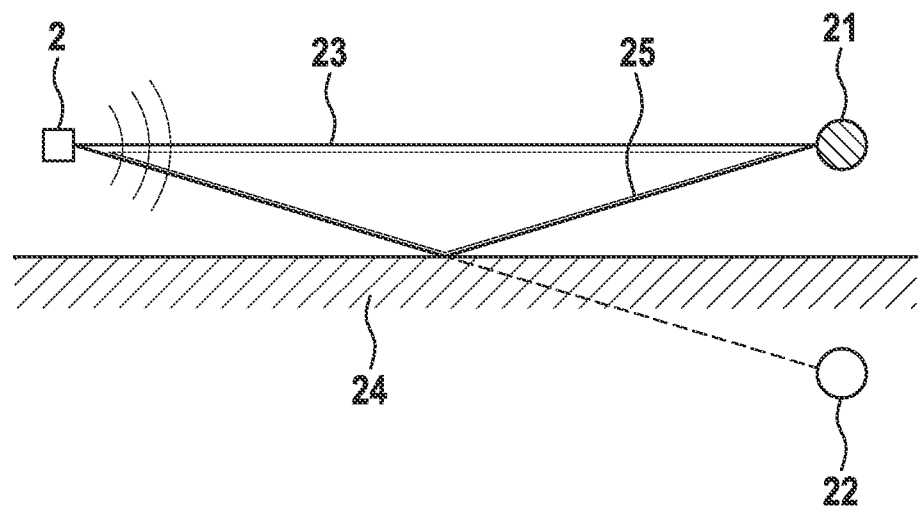
FIG. 2 shows an example situation involving an actual target and a mirror object.

FIG. 2 shows an example situation involving an actual target 21 and a mirror object 22. The radar radiation may propagate between the transceiver apparatus 2 and the target 21 over four paths. In this case, the four paths comprise a direct path, a reflection path, and two cross-paths. The four paths each comprise a first path portion from the transmit antennas 3 of the transceiver apparatus 2 to the target 21 and a second path portion from the target 21 to the receive antennas 4 of the transceiver apparatus 2.

In the direct path, the radar radiation propagates on both the first path portion and the second path portion directly, i.e., over a first propagation path 23. In the reflection path, the radar radiation propagates on both the first path portion and the second path portion by way of a reflection on an expansive object 24, i.e., along a second propagation path 25. In a first of the cross-paths, the radar radiation propagates directly on the first path portion (over the first propagation path 23) and by way of a reflection on the second path portion (over the second propagation path 25). In the second of the cross-paths, the opposite occurs, i.e., the radar radiation propagates directly on the second path portion (over the first propagation path 23) and by way of a reflection on the first path portion (over the second propagation path 25).

Figure 3:
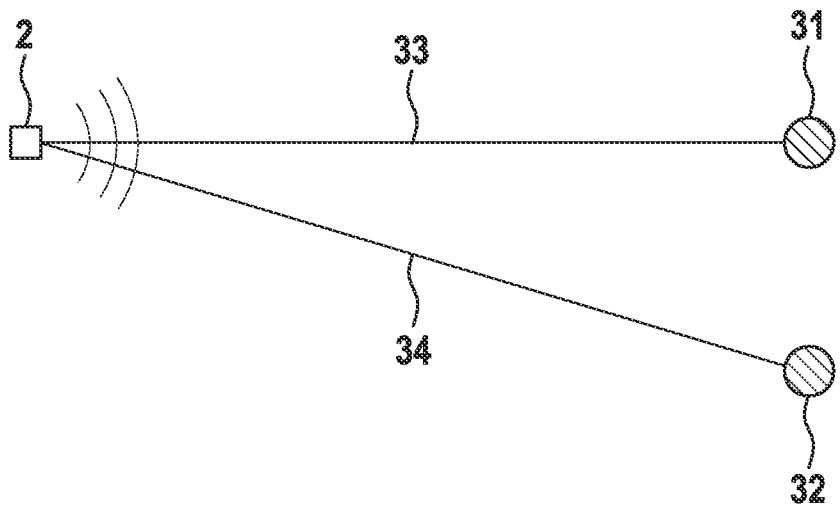
FIG. 3 shows an example situation involving two actual targets.

FIG. 3 shows an example situation involving two actual targets 31, 32. In this case, the radar radiation propagates on respective direct paths 33, 34 both on the first path portion from the transceiver apparatus 2 to the relevant target 31, 32 and on the second path portion from the relevant target 31, 32 to the transceiver apparatus 2.

The first two-target angle estimation model only takes radar radiation along two paths into consideration, i.e., on the direct path between the transceiver apparatus 2 and the target 21, 31, 32. The quality of an angle estimation on the basis of the first two-target angle estimation model will thus be high in the situation shown in FIG. 3, but it will be low in the situation shown in FIG. 2 since the cross-paths are not taken into consideration.

The second two-target angle estimation model takes the propagation of radar radiation along four paths into consideration, so the quality of an angle estimation on the basis of the second two-target angle estimation model may be high for both the situation in FIG. 2 and the situation in FIG. 3.

The single-target angle estimation model and the first and second two-target angle estimation models will be described in more detail below. In this case, the first single-target angle estimation model is a single-path model, the first two-target angle estimation model is a two-path model, and the second two-target angle estimation model is a four-path model.

The single-path model may be a virtual array model. In this model, the following applies for the received signal $\underline{x}$ for all the combinations of transmitters (TX) and receivers (RX):

$$\underline{x} = \underline{a}(\theta) \cdot s + \underline{n}$$

where $\underline{a}(\theta)$ denotes the steering vector, which indicates the amplitude ratios and phase relationships of the transmitters and receivers, s denotes a complex channel coefficient, $\underline{n}$ denotes a noise contribution, and $\theta$ indicates the angle of the target. This angle may be the azimuth angle. According to further embodiments, both the azimuth angle and the elevation angle may be determined.

In addition, the steering vector can be expressed as a Kronecker product of the contributions of the individual transmitters and receivers:

$$\underline{a}(\theta) = \underline{a}_{tx}(\theta) \otimes \underline{a}_{rx}(\theta)$$

or $$\underline{a}(\theta) = \underline{\tilde{a}}_{tx}(\theta) \otimes \underline{\tilde{a}}_{rx}(\theta)$$

where:

$$\underline{\tilde{a}}_{tx}(\theta) = \left[\frac{a_{tx,n}(\theta)}{a_{tx,1}(\theta)}\right]_{n=1,\ldots,N_{tx}}, \underline{a}_{tx}(\theta) = a_{tx,1}(\theta) \cdot \underline{\tilde{a}}_{tx}(\theta)$$

where $N_{tx}$ denotes the number of transmitters. For three transmitters and three receivers, $\underline{a}$ thus has nine entries.

The two-path model taking two paths into consideration establishes the received signal $\underline{x}$ as follows:

$$\underline{x} = A \cdot \underline{s} + \underline{n}$$

where $\theta_1$ and $\theta_2$ describe the angles of the two targets. In addition:

$$A(\theta_1, \theta_2) = [\underline{\tilde{a}}_{tx}(\theta_1) \otimes \underline{\tilde{a}}_{rx}(\theta_1) \underline{\tilde{a}}_{tx}(\theta_2) \otimes \underline{\tilde{a}}_{rx}(\theta_2)]$$

Therefore, consideration is taken only of two paths in which the angles for transmitters and receivers are the same in each case.

The four-path model (cross-path model) taking four paths into consideration establishes the received signal $\underline{x}$ as follows:

$$A(\theta_1, \theta_2) = [\underline{\tilde{a}}_{tx}(\theta_1) \otimes \underline{\tilde{a}}_{rx}(\theta_1)$$

$$\underline{\tilde{a}}_{tx}(\theta_2) \otimes \underline{\tilde{a}}_{rx}(\theta_2) \; \underline{\tilde{a}}_{tx}(\theta_2) \otimes \underline{\tilde{a}}_{rx}(\theta_1) \; \underline{\tilde{a}}_{tx}(\theta_1) \otimes \underline{\tilde{a}}_{rx}(\theta_2)]$$

The last two entries correspond to the cross-paths, the angles for transmitters and receivers being different in each case.

Owing to the reciprocity, $$\underline{\tilde{a}}_{tx}(\theta_2) \otimes \underline{\tilde{a}}_{rx}(\theta_1)$$

and $$\underline{\tilde{a}}_{tx}(\theta_1) \otimes \underline{\tilde{a}}_{rx}(\theta_2)$$

may be combined into one path:

$$A(\theta_1,$$
$$\theta_2) = [\underline{\tilde{a}}_{tx}(\theta_1) \otimes \underline{\tilde{a}}_{rx}(\theta_1) \; \underline{\tilde{a}}_{tx}(\theta_2) \otimes \underline{\tilde{a}}_{rx}(\theta_2) \; \underline{\tilde{a}}_{tx}(\theta_2) \otimes \underline{\tilde{a}}_{rx}(\theta_1) + \underline{\tilde{a}}_{tx}(\theta_1) \otimes \underline{\tilde{a}}_{rx}(\theta_2)]$$

The evaluation apparatus uses a deterministic maximum likelihood (DML) function, as shown below:

$$q^2(\theta_1,\theta_2) = \underline{x}^H \cdot P_A(\theta_1,\theta_2) \cdot \underline{x}, P_A(\theta_1,\theta_2) = A(A^H A)^{-1} A^H$$

where $P_A$ denotes the projection matrix on the column space in the matrix A.

The evaluation apparatus 5 calculates the angles $\theta_1$ and $\theta_2$ by maximizing $$q^2(\theta_1,\theta_2)$$

For the cross-path model, the MIMO estimation in relation to a non-coherent summation of the SIMO (single in, multiple out) spectra deteriorates for $N_{tx}=2$ for two transmit apparatuses. The MIMO estimation in relation to a non-coherent summation of the MISO (multiple in, single out) spectra also deteriorates when $N_{rx}=2$ for two receive apparatuses. According to the present invention, therefore, at least three transmit antennas 3 and at least three receive antennas 4 or at least two transmit antennas 3 and at least two receive antennas 4 having two-dimensional beam forming are provided.

For $N_{rx}>2$ and $N_{tx}>2$, the (power) distribution for all the paths can be estimated using the pseudo inverses $$A^+ = (A^H A)^{-1} A^H$$

in accordance with the following formula:

$$\hat{\underline{s}} = A^+ \cdot \underline{x}$$

The evaluation apparatus 5 is configured to evaluate the radar data using the single-path model and the further two-target angle estimation models (two-path model and four-path model). Using the four-path model, the relative strength of the individual propagation paths can be estimated. If an actual object is measured in a situation involving multipath propagation, the cross-paths, which have different transmit and receive angles, carry a similarly high power proportion as the direct path and the reflection path, i.e., the ratio of the radar power of the cross-paths to the radar power of the reflection path and/or direct path exceeds a predetermined threshold value. Therefore, in a situation such as this, only one of the two angles corresponds to the actual target 21. The second angle corresponds to a mirror object 22, which does not actually exist. By way of geometric observations using measured stationary targets, or by way of tracking the actual target 21, the evaluation apparatus 5 identifies the angle that corresponds to the mirror object 22.

In a situation not involving multipath propagation, as shown in FIG. 3, the power proportion of the cross-paths is very low, i.e., the ratio of the radar power of the cross-paths to the radar power of the reflection path and/or direct path is lower than a predetermined threshold value. The evaluation apparatus 5 then establishes that the two estimated angles correspond, with high probability, to radar reflexes of one or more actually existing objects.

If there are fewer than three transmit antennas and three receive antennas available for the angle estimation, then alternatively an emit angle and a receive angle can be determined using two-dimensional beam forming. The similarity of the two angles is a measure for the applicability of the virtual MIMO array model and also makes it possible to recognize detections that only contain signal energy from cross-paths and thus do not correspond to a genuine target. The evaluation apparatus 5 can therefore recognize whether or not a reflection has occurred on the basis of a ratio of the two angles.

Figure 4:
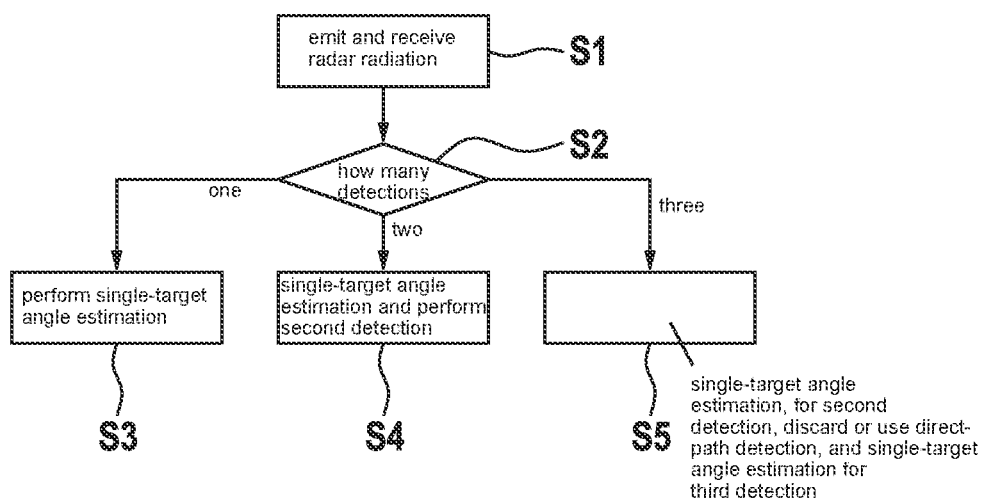
FIG. 4 shows a schematic flowchart of a radar method according to a specific example embodiment of the present invention.

FIG. 4 shows a flowchart of a radar method. In particular, the above-described radar device 1 may be configured to carry out the radar method described below.

In a first step S1, radar radiation is emitted and received using a transceiver apparatus 2. The transceiver apparatus 2 generates radar data on the basis of the received radar radiation. In this case, the transceiver apparatus 2 comprises at least three transmit antennas and at least three receive antennas or at least two transmit antennas and at least two receive antennas having two-dimensional beam forming.

Signals emanating from actual targets are detected on the basis of the radar data. The signals, or targets, can be assigned distance and velocity values, i.e., (d,v) cells.

In a second step S2, it is established how many detections there are. For the situation illustrated in FIG. 3, the individual paths may be detected in different (d,v) cells depending on the separation capabilities of the radar device 1 in relation to both distance and velocity, in particular in the close range and when there are relatively large angular differences between the propagation directions. Owing to the different propagation directions, differences in path lengths and velocities occur. In this case, the direct path always has the shortest path length while the reflection path has the longest path length. The two cross-paths have the average of the path length of the direct path and reflection path. These ratios can analogously also be transferred to the measured velocities, i.e., the two cross-paths are measured using the average of the two velocities of the direct path and reflection path.

One, two, or three detections may occur depending on the path length differences, the associated phase positions, and, where applicable, a beam-forming step upstream of the detection via transmit antennas and/or receive antennas.

When precisely one detection occurs, all four paths fall into the same (d,v) cell and are overlaid in one detection. In the event of two detections, either the direct path and the two cross-paths may be overlaid in one detection and the reflection path may generate a separate prediction (first case for two detections), or the direct path may generate a separate detection and the reflection path and the two cross-paths are overlaid in one detection (second case for two detections). In the event of three detections, the direct path, the two cross-paths, and the reflection path each generate a separate detection. The case of two detections may occur owing to the relative phase position of the different paths and the directivity pattern of the beam-forming step.

For each detection, a single-target angle estimation is performed first using the single-target angle estimation model (single-path model). If the quality is low, a two-target estimation is performed using the two-path model (two-target angle estimation model that takes two paths into consideration) or using the four-path model (two-target angle estimation model that takes four paths into consideration). In the case of an estimation using the four-path model, by comparing the powers of the four signal vector entries assigned to the four paths, the relative strength of the cross-paths compared with the direct path and the reflection path can be determined. This information can then be used to identify the angle of the reflection path and thus to avoid the occurrence of ghost objects or mirror objects. The precise evaluation for the different numbers of detections will be described below.

If there is precisely one detection, step S3, a single-target angle estimation is performed. Since the detection includes power from all four paths, the quality of the single-target angle estimation will be low in a situation as shown in FIG. 2 or 3.

In addition, an angle estimation is performed using the two-path model. For the situation illustrated in FIG. 2, low quality is generally also obtained in the two-target estimation using two paths owing to the model violation, since four paths actually occur.

In addition, an angle estimation is performed using the four-path model. The estimation using the four-path model delivers a relatively high power proportion for the cross-paths, so multipath propagation can be recognized. By way of geometric observations using measured stationary targets, or by way of tracking the actual target, the angle that corresponds to the mirror object can be identified and discarded.

For two detections, step S4, a distinction is drawn between the first case for two detections and the second case for two detections, as described above. In the first case, for the first detection (direct path and cross-paths), the procedure is similar to the case of one detection.

In addition, however, a second detection (reflection path) also occurs, which may lead to a mirror object. If this detection actually only contains the power of the reflection path, high quality is obtained with the single-target angle estimation. The resulting estimation result may lead to a mirror object occurring, the position of which does not coincide with the position of the actual object. This mirror object may, however, be suppressed by jointly observing the estimates for both detections. If the multipath situation is recognized in the first detection and the mirror angle established in the process is similar to the estimated angle of the second detection (i.e., the ratio of the angle exceeds a predetermined threshold value) and the estimated distances and relative velocities of the two detections are similar enough (i.e., the ratios of the distances and velocities exceed predetermined threshold values), the mirror object caused by the second detection is identified as such. If the single-target quality of the second detection is not high (i.e., is lower than a predetermined threshold value), the method steps are applied as in the case of one detection.

In the second case for two detections, a single-target angle estimation generally leads to high quality for the first detection (direct path). The procedure can be analogous to the first case for two detections, although the description of "first" and "second" detection has to be swapped. For the second detection, therefore, two angles and the power proportion of the cross-paths are determined using the four-path model. By comparing the two angles with the angle of the first detection, the angle of the reflection path can be discarded and thus a mirror object can be prevented from occurring. If the single-target quality of the first detection is not high, then the four-path model is also applied here.

For three detections, step S5, a single-target angle estimation generally leads to high quality for the first detection (direct path). In the second detection (cross-paths), for the situation shown in FIG. 2 it is recognized, by way of the four-path model and the power estimation, that this detection only contains cross-path power. Accordingly, either the detection can be discarded, or the direct-path detection can be used to recognize the estimated angle, out of the two estimated angles, of the cross-path detection that corresponds to the direct-path angle.

In the third detection (reflection path), a single-target angle estimation generally also leads to high quality. To recognize the estimated angle as a mirror angle, the method for two detections is used. If low single-target angle qualities occur in the direct-path and reflection-path detections (below predetermined threshold values), the method for one detection is carried out.

"High" or "low" quality as set out above should be understood to mean that the quality is higher or lower than a relevant threshold value.

According to further specific embodiments, the elevation angle of the targets may be determined in addition to the azimuth angle. For this purpose, further transmit antennas and receive antennas may be present in addition to the three transmit antennas and three receive antennas for the azimuth estimation. For example, at least one further, vertically shifted transmit antenna or receive antenna may be used to estimate the elevation angle therefrom.

If at least three transmit antennas and three receive antennas are also used for estimating the elevation, then the four-path model may also be used for the elevation estimation. If there are fewer than three transmit antennas and three receive antennas available for estimating the elevation, then a two-dimensional beam forming of the transmit angles and receive angles can alternatively be carried out. The position of the power maximum allows the transmit angle and receive angle to be determined. The similarity of the two angles is a measure of the applicability of the virtual MIMO array model. If the two angles are similar enough, a MIMO angle estimation can be performed using the single-target angle estimation model (single-path model) and, where applicable, also using the two-target angle estimation models (two-path model, four-path model), in order to allow the angles to be separated in the elevation direction. In addition, by observing the similarity of the transmit angle and receive angle, it is possible to recognize detections that merely contain signal energy of cross-paths and thus do not correspond to a genuine target.

What is claimed is:

1. A radar device, comprising:
   a transceiver apparatus that includes: (i) at least three transmit antennas and at least three receive antennas, or (ii) at least two transmit antennas and at least two receive antennas having two-dimensional beam forming, wherein the transceiver apparatus is configured to emit radar radiation using the transmit antennas, to receive radar radiation using the receive antennas, and to generate radar data based on the received radar radiation; and an evaluation apparatus configured to establish whether radar radiation has propagated between the transceiver apparatus and at least one target either directly or at least partly by way of at least one reflection by:
using a multitarget angle estimation model, wherein the multitarget angle estimation model estimates parameters of respective contributions to the radar radiation by each of at least four predefined categories of paths of radar radiation propagation;
comparing the respective contributions to one another;
using a further multitarget angle estimation model that takes into consideration propagation of radar radiation along two paths; and
using a single-target angle estimation model, a quality of the angle estimation using the further multitarget angle estimation model and a quality of the angle estimation using the single-target angle estimation model being taken into consideration by the evaluation apparatus during the establishing;
wherein, in the event of multiple detections, the evaluation apparatus is configured to:
when the quality of the angle estimation using the single-target angle estimation model is greater than a predetermined threshold value, carry out an angle estimation for each detection using the single-target angle estimation model to establish that radar radiation has propagated to the at least one target directly; and
when the quality of the angle estimation using the single-target angle estimation model is lower than or equal to the predetermined threshold value, establish, based on an angle estimation using the multitarget angle estimation model and the further multitarget angle estimation model, whether radar radiation has propagated between the transceiver apparatus and the at least one target either directly or at least partly by way of at least one reflection.

2. The radar device as recited in claim 1, wherein the four paths include a direct path, a reflection path, and two cross-paths, wherein the four paths each includes a first path portion from the transmit antennas to the target and a second path portion from the target to the receive antennas, wherein, in the direct path, the radar radiation propagates directly on both the first path portion and the second path portion, wherein, in the reflection path, the radar radiation propagates by way of a reflection on both the first path portion and the second path portion, wherein, in a first of the cross-paths, the radar radiation propagates directly on the first path portion and by way of a reflection on the second path portion, and wherein, in a second of the cross-paths, the radar radiation propagates directly on the second path portion and by way of a reflection on the first path portion.

3. The radar device as recited in claim 1, wherein the multitarget angle estimation model is a four-path model that takes propagation of radar radiation along four paths into consideration, wherein the evaluation apparatus is configured to calculate a radar power for each of the four paths by evaluating the radar data using the four-path model, and wherein the evaluation apparatus is configured to establish, by taking the calculated radar powers into consideration, whether radar radiation has propagated between the transceiver apparatus and the at least one target either directly or at least partly by way of at least one reflection.

4. The radar device as recited in claim 3, wherein the evaluation apparatus is configured to establish that radar radiation has propagated between the transceiver apparatus and the at least one target at least partly by way of at least one reflection when a ratio of the radar power of the cross-paths to radar power of the reflection path and/or direct path is greater than a predetermined threshold value.

5. The radar device as recited in claim 3, wherein the evaluation apparatus is configured to establish that radar radiation has propagated between the transceiver apparatus and the at least one target directly when a ratio of radar power of the cross-paths to the radar power of the reflection path and/or direct path is lower than a predetermined threshold value.

6. The radar device as recited in claim 1, wherein the evaluation apparatus is configured to, after having established that radar radiation has propagated between the transceiver apparatus and the at least one target at least partly by way of at least one reflection, recognize a mirror object and/or an object causing the at least one reflection, based on geometric calculations and/or based on tracking the at least one target.

7. The radar device as recited in claim 1, wherein the evaluation apparatus is configured to establish whether radar radiation has propagated between the transceiver apparatus and the at least one target either directly or at least partly by way of at least one reflection by additionally using a single-target angle estimation model, wherein the evaluation apparatus is configured to take a quality of an angle estimation using the single-target angle estimation model into consideration during the establishing.

8. A radar method, comprising the following steps:
emitting and receiving radar radiation using a transceiver apparatus including: (i) at least three transmit antennas and at least three receive antennas, or (ii) at least two transmit antennas and at least two receive antennas having two-dimensional beam forming;
generating radar data based on the received radar radiation; and
establishing whether radar radiation has propagated between the transceiver apparatus and at least one target either directly or by way of at least one reflection by:
using a multitarget angle estimation model, wherein the multitarget angle estimation model estimates parameters of respective contributions to the radar radiation by each of at least four predefined categories of paths of radar radiation propagation;
comparing the respective contributions to one another
using a further multitarget angle estimation model that takes into consideration propagation of radar radiation along two paths; and
using a single-target angle estimation model, a quality of the angle estimation using the further multitarget angle estimation model and a quality of the angle estimation using the single-target angle estimation model being taken into consideration by the evaluation apparatus during the establishing;
wherein the method includes executing an algorithm that defines that, in the event of multiple detections:
when the quality of the angle estimation using the single-target angle estimation model is greater than a predetermined threshold value, the method includes carrying out an angle estimation for each detection using the single-target angle estimation model to establish that radar radiation has propagated to the at least one target directly; and when the quality of the angle estimation using the single-target angle estimation model is lower than or equal to the predetermined threshold value, the method includes establishing, based on an angle estimation using the multitarget angle estimation model and the further multitarget angle estimation model, whether radar radiation has propagated between the transceiver apparatus and the at least one target either directly or at least partly by way of the at least one reflection.

9. The radar device as recited in claim 1, wherein the parameters include angle and signal power.

10. The radar device as recited in claim 1, wherein the at least four predefined categories includes a first category of direct paths, a second category of reflected paths, a third category of a first type of cross path, and a fourth category of a second type of cross path.

11. A radar device, comprising:
a transceiver apparatus that includes: (i) at least three transmit antennas and at least three receive antennas, or (ii) at least two transmit antennas and at least two receive antennas having two-dimensional beam forming, wherein the transceiver apparatus is configured to emit radar radiation using the transmit antennas, to receive radar radiation using the receive antennas, and to generate radar data based on the received radar radiation; and an evaluation apparatus configured to perform a target identification using an evaluation that establishes whether the received radar radiation has propagated between the transceiver apparatus and at least one target either directly or at least partly by way of at least one reflection by performing a multi-tiered model application evaluation of the radar data, the evaluation including:
in a first evaluation, initially evaluating the radar data to identify one or more targets using a first angle estimation model that takes into consideration propagation of the radar radiation along a first number of path types, the first number being at least one;
determining a value of a quality of a result of the first evaluation;
comparing the value of the quality of the result to a predefined threshold value; and
responding to a result of the comparison being that the value of the quality is below the predefined threshold by performing a second evaluation in which the radar data is re-evaluated to identify the one or more targets using a second angle estimation model that takes into consideration propagation of the radar radiation along a second number of path types, the second number being greater than the first number.

* * * * *